March 10, 1964  C. P. HUDNALL, JR., ETAL  3,124,204
FACE DRILL
Filed June 6, 1960  4 Sheets-Sheet 1
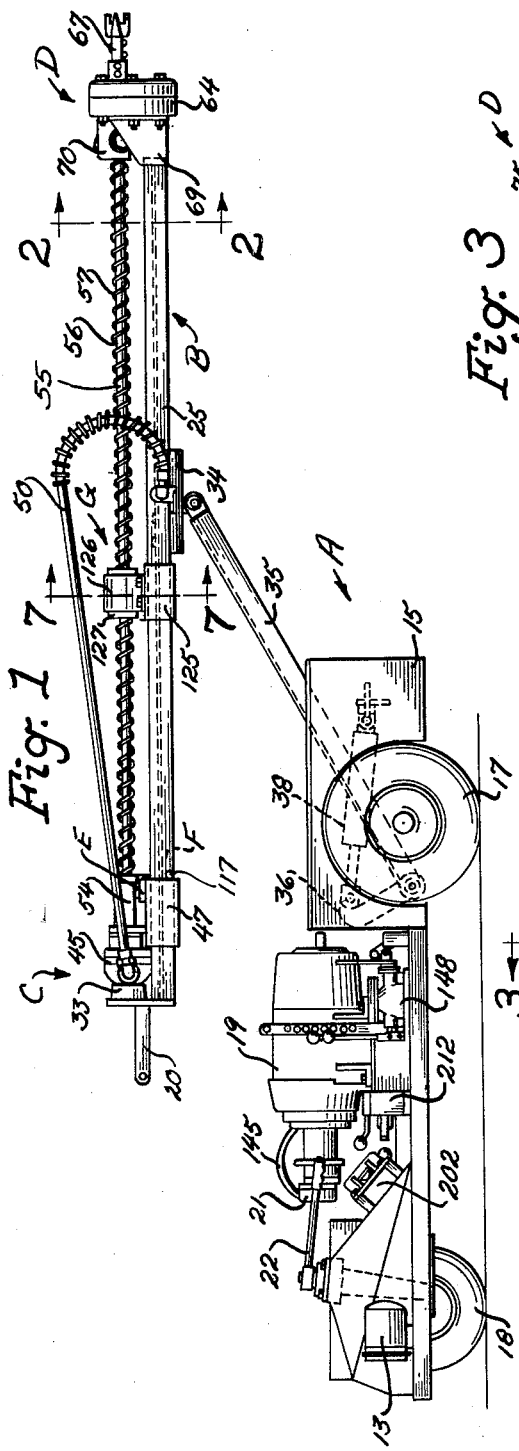
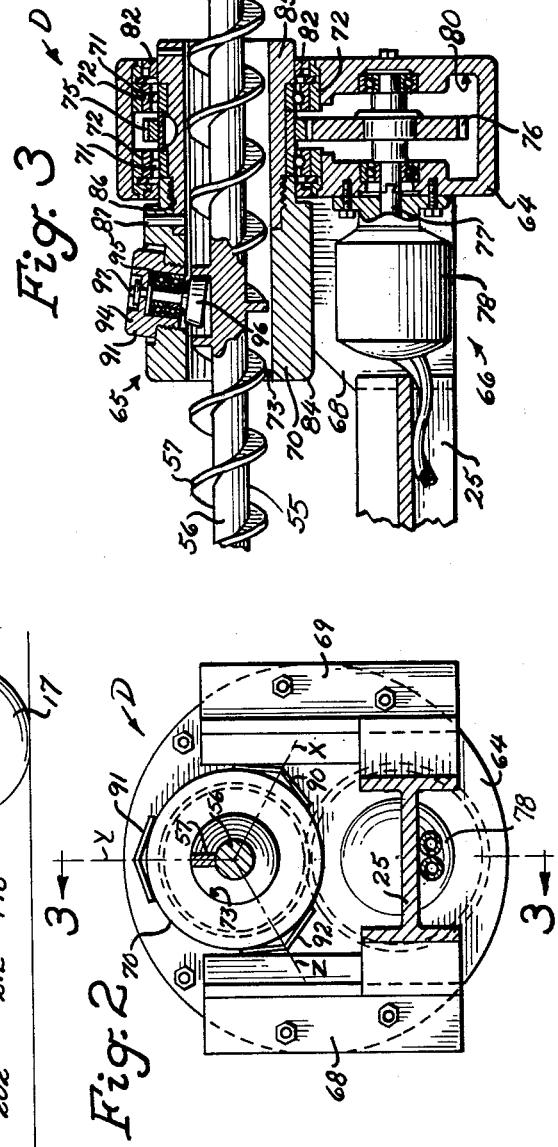
INVENTORS
Charles P. Hudnall, Jr.
John B. Long
BY
ATTORNEYS

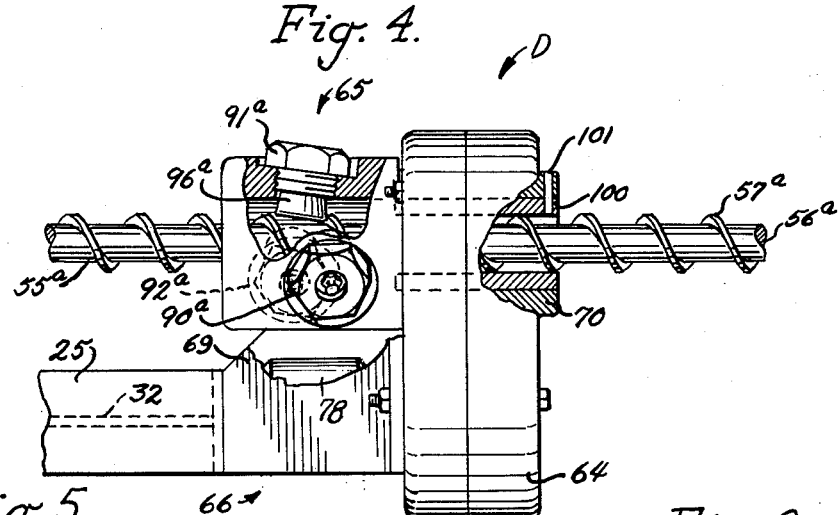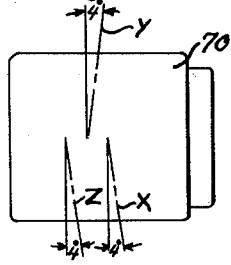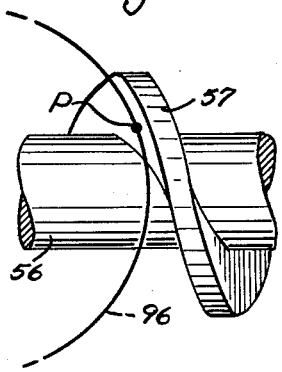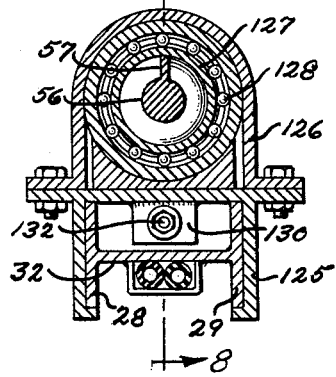

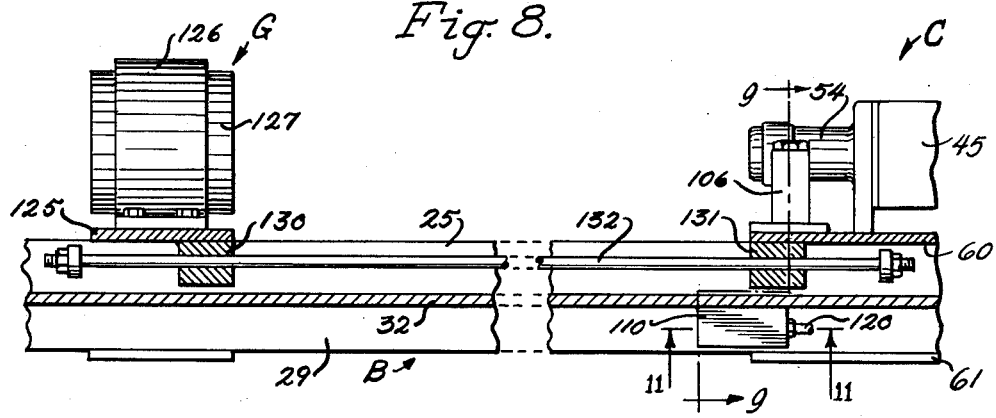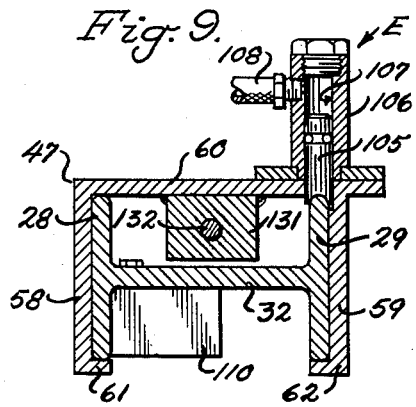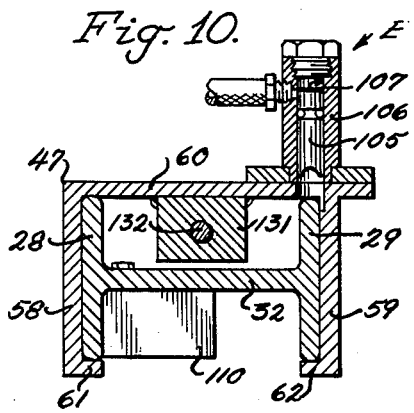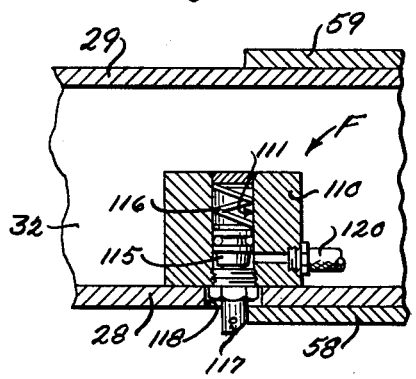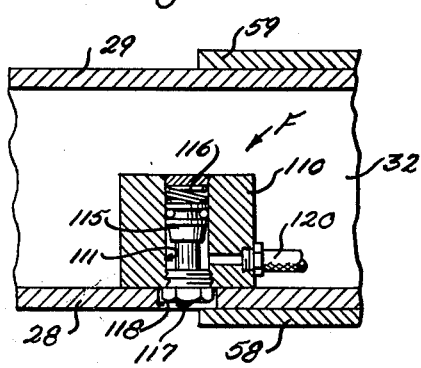

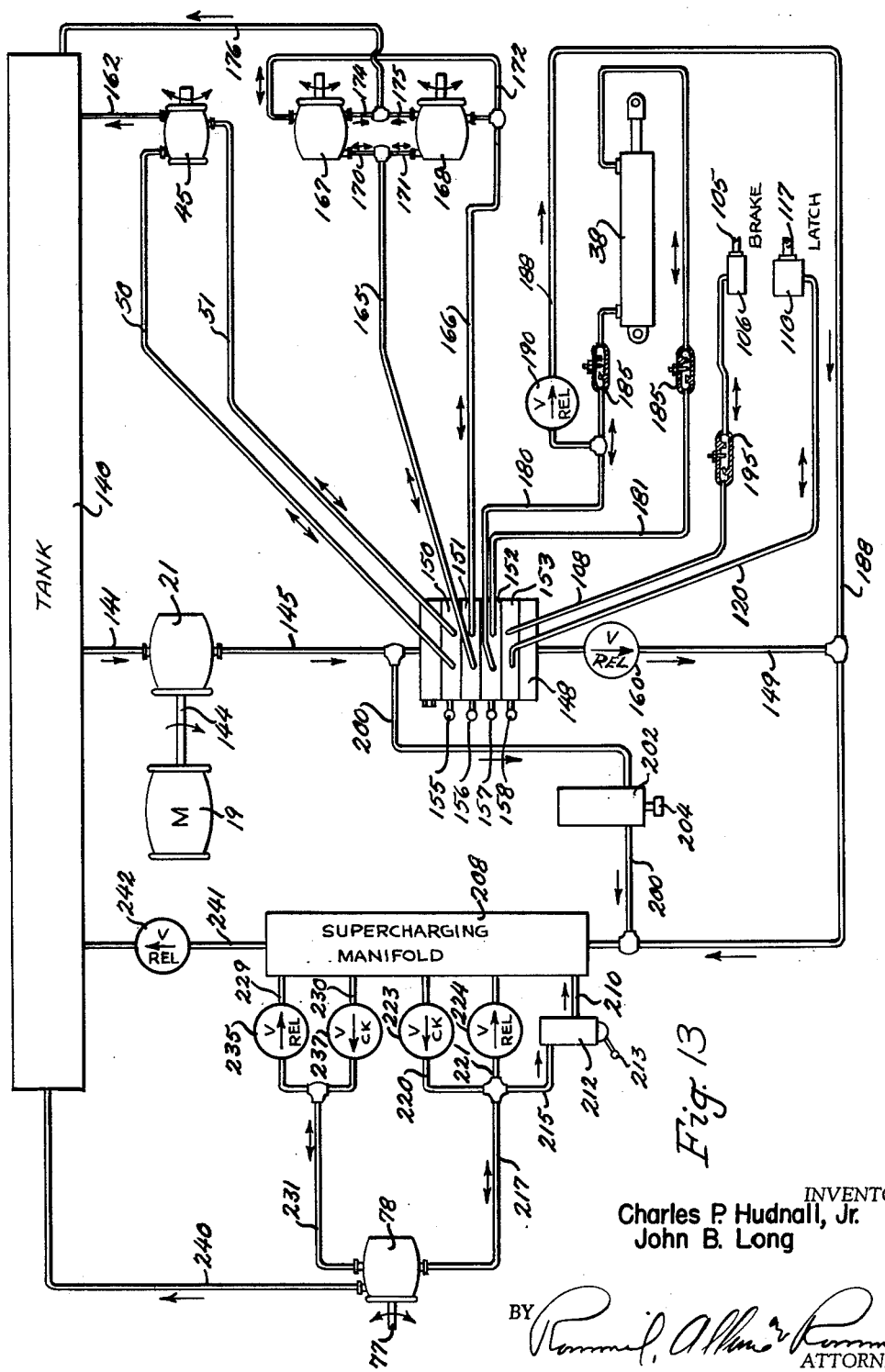

United States Patent Office 3,124,204
Patented Mar. 10, 1964

3,124,204
FACE DRILL
Charles P. Hudnall, Jr., and John B. Long, Oak Hill,
W. Va., assignors to Marmon-Herrington Company,
Inc., Indianapolis, Ind., a corporation of Indiana
Filed June 6, 1960, Ser. No. 34,269
6 Claims. (Cl. 173—145)

This invention relates to improvements in face drills, particularly with respect to improvements in face drills of the type wherein the drill motor of the face drill provides the motive power to advance the auger into the working face, such as the face drill shown in the United States patent application of Charles P. Hudnall, Jr., application Serial No. 800,804, filed March 20, 1959, now U.S. Patent 3,028,922.

The primary object of our invention is the provision of a thrust head for face drills of the type wherein the drill motor provides the motive power to advance the drill auger into the working face, the thrust head serving to properly center and support the auger so that the same is maintained in juxtaposition with respect to the working face and binding of the auger with the thrust head is avoided.

A further object is the provision of a thrust head for face drills of the type above noted, wherein the auger contacting portions of the thrust head are angularly disposed with respect to the auger, so that contact with the lip of the auger is avoided, thus providing a contacting surface that will not exert force upon the lip of the auger that might tend to distort the lip and render the auger inefficient in drilling.

A further object is the provision of a thrust head for face drills of the type above described, wherein the auger contacting rollers thereof may be easily removed and replaced when the same become damaged or when a different form of roller is required.

A further object of the invention is the provision of a thrust head that is adaptable for use with augers of various diameters.

A further object is the provision of a center guide for face drills of the type described, the guide being disposed intermediate the drill motor and the thrust head, for limiting the whip of the auger.

A further object is the provision of brake means for controlling the rate of drill feed.

A further object is the provision of lock means for retaining the drill carriage in its extreme retracted position and preventing accidental feeding of the auger.

A further object is the provision of an improved hydraulic fluid supply system for face drills.

Other objects and advantages of our invention will be apparent during the course of the following detailed description of the invention, taken in connection with the accompanying drawings, forming a part of this specification, and in which drawings:

FIG. 1 is a side elevation of an improved face drill.

FIG. 2 is an enlarged transverse sectional view taken substantially on the line 2—2 of FIG. 1.

FIG. 3 is a fragmentary vertical sectional view taken substantially on the line 3—3 of FIG. 2.

FIG. 4 is a fragmentary sectional view similar to FIG. 3, showing the thrust head adapted to receive an auger of a smaller diameter than that shown in FIG. 3.

FIG. 5 is a somewhat diagrammatic view of the thrust housing of our thrust head, showing the location of the thrust rollers therein for proper contact with an auger.

FIG. 6 is a diagrammatic view illustrating the contact of the thrust roller of our improved thrust head with the flight of an auger.

FIG. 7 is an enlarged transverse sectional view taken substantially on the line 7—7 of FIG. 1.

FIG. 8 is a fragmentary sectional view taken substantially on the line 8—8 of FIG. 7.

FIG. 9 is a fragmentary vertical sectional view taken substantially on the line 9—9 of FIG. 8.

FIG. 10 is a fragmentary view similar to FIG. 9 but showing parts thereof in a different operating position.

FIG. 11 is a fragmentary horizontal sectional view taken substantially on the line 11—11 of FIG. 8.

FIG. 12 is a fragmentary sectional view similar to FIG. 9, but showing parts thereof in different operating positions.

FIG. 13 is a diagrammatic view of our improved hydraulic system.

In the drawings, wherein for the purpose of illustration is shown a preferred form of the invention, and wherein similar reference characters designate corresponding parts throughout the several views, the letter A may generally designate a mobile carrier; B the drill frame supported upon the moble carrier A; C a drill unit supported upon the frame B; D our improved thrust head mounted upon the frame B in operative relationship with respect to the drill unit C; E our improved brake means for controlling the rate of drill feed; F our improved latch means for retaining the drill unit C in fully retracted position; and G our improved center guide for limiting the "whip" of the auger intermediate the drill unit C and thrust head D.

The mobile carrier A is preferably a self-tramming vehicle carrying a power source for the supply of hydraulic fluid under pressure for activating the various units of the drill. In the drawings, the mobile carrier A is shown as comprising a main body portion 15 mounted upon rear wheels 17 and front wheels 18, the rear wheels being the drive wheels and the front wheels 18 being pivotally mounted upon the body portion 15 for steering of the mobile carrier A. A steering bar 22 may be positioned for convenient steering and headlights 13 may be provided for illumination.

The mobile carrier shown is specifically designed for use in low ceiling coal mines and the body portion 15 preferably carries an electric power source 19 for driving a hydraulic pump 21 that supplies the necessary hydraulic pressure to the various units of the drill. A hydraulic fluid supply tank and conventional control valves for the selective supplying of hydraulic fluid to the various units of the face drill may be mounted upon the mobile carrier A, as will be subsequently described.

The drill frame B preferably comprises an elongated track 25 that is preferably of the I-beam or H-beam type, having a pair of longitudinally extending vertical side members 28 and 29, and a longitudinally extending horizontal web portion 32 interconnecting the vertical side members 28 and 29.

Mounted at one end of the track 25 is a bumper 33 for absorbing the impact of the drill unit C when the same is retracted from the working face. A handle portion 20 may be provided adjacent the bumper 33 as an aid in guiding the drill.

The drill frame B is preferably supported upon a pivot plate 34, so that the same may be pivotally and movably adjusted with respect to the mobile carrier. The pivot plate 34 is mounted upon a boom 35 that is supported upon the body portion 15 by linkage 36 so that the boom may be raised and lowered by the hydraulic cylinder 38. The boom 35 is preferably hollow so that hydraulic conduits leading to apparatus mounted on the frame B may be entrained therethrough in a protected position. This mounting permits both vertical and horizontal angular movement of the drill frame B with respect to the mobile carrier A.

The drill unit C preferably comprises a drill motor 45 and a carriage 47 for slidably supporting the drill motor 45 upon the track 25.

The drill motor 45 is a conventional reversible hydraulic motor fixedly secured to the carriage 47, having a pair of inlet and outlet conduits 50 and 51 for the inflow and outflow of hydraulic fluid, the flow within the conduits 50 and 51 being reversible, dependent upon whether the hydraulic motor is to be rotated in a clockwise or a counterclockwise direction, as will be subsequently described. The hydraulic motor 45 carries an auger socket 54 for receiving the auger 55.

The auger 55 is a conventional screw-type auger having an elongated central shaft 56 provided with a helical flight or spiral scroll 57 about substantially the entire length thereof. In the type of drill shown in the drawings, the auger is approximately nine feet long and the scroll has a pitch of approximately two inches.

The supporting carriage 47 for the drill motor 45 preferably comprises a pair of side plates 58 and 59 that are of the same height as the side members 28 and 29 of the track 25, and an upper plate 60, with each of the side plates 58 and 59 being provided with inturned flange portions 61 and 62. The carriage 47 is thus slidably socketed upon the track means 25, as shown in FIGS. 9 and 10. This carriage 47 slidably supports the drill motor 45 upon the track 25 and the entire drill unit C can be moved, in either direction, longitudinally along the track 25.

The thrust head D comprises a means for feeding the auger into and out of the working face and preferably includes a drill head housing 64 mounted upon one end of the track means 25, which drill head housing supports a rotary thrust housing 65, which receives the auger of the drill unit C, and which is rotatably mounted upon the drill head housing 64, and brake means 66 for retarding the rotation of the rotary thrust housing. Spikes 67 may be mounted upon the housing 64, to either side of the auger, for engaging the working face as an aid to maintaining the drill in juxtaposition with respect thereto.

The drill head housing 64 is preferably mounted at one end of the track means 25 by means of side plates 68 and 69, with the rotary thrust housing 65 in axial alignment with the auger 55.

The rotary thrust housing 65 preferably includes a rotary thrust tube 70 that is supported within the drill head housing 64 by bearings 71 that are retained within the drill head housing 64 by the bearing housing 72. The thrust tube 70 is provided with a longitudinally extending passageway 73 therethrough having a diameter slightly greater than the outer diameter of the auger 55. A drive gear 75 is keyed to the rotary thrust tube 70, the drive gear 75 meshing with a pump gear 76, which is mounted within the drill head housing 64 and keyed to the shaft 77 of a hydraulic pump 78. The hydraulic pump 78, shaft 77, and the gears 75 and 76 comprise the brake means 66, which operates in a manner so that when a back pressure load is applied to the pump 78, such load will cause shaft 77 to rotate slower than when the pump was in a "no load" condition, which, through the relationship of gears 75 and 76 will slow or brake the rotation of rotary thrust tube 70, as will be subsequently described. The chamber 80, defined by the drill head housing 64 contains the bearings 71 for rotary support of the thrust tube 70, the pump gear 76 and drive gear 75, and may be filled with lubricating fluid. Oil seals 82 are provided for sealing the lubricant within the drill head housing 64, while permitting rotation of the rotary thrust tube 70.

The rotary thrust tube 70 may be in one piece or, as shown in the drawings, may consist of separate sections 84 and 85 secured together by threads 86 with a roll pin 87 to prevent accidental separation. The rotary thrust tube is preferably made of aluminum in order to reduce the inertia effect of rotation.

Mounted within the rotary thrust tube 70, and spaced diametrically and longitudinally thereabout in such a manner as to correspond to the pitch of the auger, are cams 90, 91 and 92. The diametrical spacing of these cams is shown in FIG. 2, where lines X, Y and Z designate the longitudinal axis of cams 90, 91 and 92, respectively. The longitudinal angular disposition and spacing of these cams is diagrammatically illustrated in FIG. 5, in which figure the lines X, Y and Z again correspond to the longitudinal axis of the cams 90, 91 and 92, respectively. In this diagrammatic view the longitudinal axis of each cam is at an angle of four degrees with respect to the normal of the longitudinal axis of the rotary thrust tube 70. The spacing and angular disposition of these cams will be varied to correspond to the pitch of the auger and spaced apart to interfit between the flights of the auger.

Each of the cams preferably comprise a bearing cap 94, bearings 95, and a rotary thrust roller 96. A grease fitting 97 may be provided for lubrication of the bearings 95.

It will be noted, from FIG. 3, that the cams are removably secured within the rotary tube 70, with each bearing 95 rotatably supporting the thrust roller 96 so that the face thereof is angularly disposed to abut the auger flight 57 well down on the flight, adjacent the shaft 56, so that there will be no tendency of the roller to burr over or otherwise disfigure the lip of the flight.

The combined effect of the rollers of the cams 90, 91 and 92 is a form of rotary and sliding contact with the auger, whereby the axial cooperation between the cams serves to center the auger, with the cams so spaced as to provide maximum cumulative feeding action with respect to the auger.

It is obvious that the spacing between the cams may be varied to accommodate varying pitches in the augers, the rollers being angularly disposed to properly contact the flights, and the length of the face of the rollers can be varied to accommodate varying diameters of augers.

In FIG. 4 there is shown an auger 55ᵃ of less diameter than that shown in FIG. 3, and having a correspondingly smaller shaft 56ᵃ and flights 57ᵃ. The cams 90ᵃ, 91ᵃ and 92ᵃ are identical to the cams 90, 91 and 92, with the exception that cams 90ᵃ, 91ᵃ, and 92ᵃ are provided with thrust rollers 96ᵃ having longer faces to properly abut the flights of the auger and to center the auger. Thrust tube 70 is provided with an insert 100 to provide additional supporting and centering effect for the auger. The thrust tube insert 100 may be held within the thrust tube by means of roll pin 101.

Cams having thrust rollers of various lengths and thrust tube inserts having various inner diameters may be quickly and easily positioned in thrust tube 70 so that a single thrust tube can be easily modified to support augers having varying diameters.

Although it might appear, from viewing FIGS. 3 and 4, that the cams 96 and 96ᵃ abut the flight 57 at a point in axial alignment with the cams and auger, this is not the case. Due to the angular pitch of the flights, and the angular disposition of the roller cams themselves, the rollers will contact the flight off center, as shown by contact point P of FIG. 6. This point P would, of course, correspond to the contact point of only one of the roller cams, the other being proportionately spaced thereabout, as is obvious.

Our improved thrust head operates substantially upon the same principle as set forth in the aforementioned application Serial No. 800,804, filed March 20, 1959, now U.S. Patent 3,028,922, i.e., the abutment of the rollers 96 with the auger flights 57 will cause the thrust tube to rotate in accordance with the rotation of the auger, thereby rotating drive gear 75 and pump gear 76 at the same rate of rotation as the auger 55 when there is no load applied to the pump 78. When load is applied to the pump, by restricting the flow of hydraulic fluid to the hydraulic pump 78, as will be subsequently described, rotation of the thrust tube is retarded, so that the rollers 96 abut against the flights 57 of the auger 55, thereby feeding the auger.

Brake means E preferably comprises housing 106 mounted upon the plate 60 of the carriage 47. The housing 106 has a chamber 107 into which a piston 105 interfits and into which a hydraulic line 108 leads for the feeding of hydraulic fluid. The brake means E is positioned upon the carriage 47 so that the piston 105 is in alignment with one of the sides of the track means 25, as side 29 in the drawings. In the normal operation of the carriage, the piston will be raised as shown in FIG. 10, so that the carriage 47 is freely movable along the track 25. Under certain conditions in drilling, however, it is desired to brake the rate of drill feed, such as when the auger is initially started in a face, with the auger penetrating to a depth where the effort on the scroll to convey the cuttings from the hole is greater than that required to penetrate. This condition then causes the auger to feed in faster than the material can be conveyed from the cut, and results in a choking action which stalls the drill motor. Operators will be familiar with this particular drilling problem and can apply resistance to penetration by using the brake means E which will retard the rate of feed of the auger and allow the scroll rotation to clean the hole of cuttings.

Latch means F comprises a housing 110 secured beneath the web 32, which housing has a chamber 111 within which is mounted a piston 115 and a spring 116. The piston 115 has an elongated shaft portion 117 which extends through an opening 118 provided in the track means 25, in a position to abut against the forward edge of the carriage 47. Normally, when the entire drill is being moved, it is desirable to lock the carriage 47 in its fully retarded position, and the latch will then assume the position shown in FIG. 11, with the spring 116 urging the shaft 117 outwardly through the opening 118 and into abutment with the side 58 of the carriage 47. Now, when it is desired to begin the drilling operation, and release the latch means F, hydraulic fluid is supplied through the conduit 120 into the chamber 111, forcing the piston 115 in a direction so that the shaft 117 is withdrawn from the opening 118, compressing the spring 116. The latch is then in the position as shown in FIG. 12, and the carriage 47 may be freely moved.

Center guide G is designed to support the auger at a point spaced substantially equidistantly between the drill unit C and the thrust head D. Without such central support, the auger has a tendency to "whip," whereby it may become permanently bent so that it becomes useless or, if the "whipping" is substantial, the auger may snap.

The center guide G preferably comprises a sliding bracket 125 that is supported upon the track means 25 for sliding movement therealong. The pillow block 126 having a tube 127 rotatably supported therein by means of bearings 128 is mounted upon the sliding support 125. The tube 127 has an inside diameter which is only slightly larger than the outer diameter of the auger, so that the auger is rotatably supported by the tube 127.

Secured to the movable support 125, and preferably positioned to lie just above the central web 32 of the track 25, is a pull block 130. A similar pull block 131 is provided upon the carriage 47 of the drill feed means C. Interconnecting the pull blocks 130 and 131 is an elongated shaft 132.

In the feeding of the auger the rotation of the auger will carry the center guide G along in the direction of drilling, the center guide G "floating" with advancement of the auger. The interconnection of the carriage 47 and the sliding support 125 assures that the center support G will not merely gravitate too rapidly toward the thrust head D, leaving an unsupported length of the auger, and the center guide G will "float" at some point between the thrust head and the drill motor, along the shaft 132. Upon retraction of the auger, the rod 132 will pull the center guide back to its central starting position.

The power supply for the various elements of the drill preferably include a hydraulic fluid supply tank 140 mounted on the carrier A, with a fluid supply line 141 leading from the tank 140 to the hydraulic pump 21. The hydraulic pump 21 is preferably connected to and driven by the electric motor 19, through the coupling shaft 144. The pump 21 is preferably a vane type hydraulic pump capable of pumping 12.5 gallons per minute, operating at a speed of 1750 revolutions per minute and delivering hydraulic fluid at a pressure of 2000 p.s.i. Hydraulic fluid is pumped from the pump 21 through the supply line 145 to a valve bank 148. The valve bank 148 is provided with a plurality of independently operable valve sections 150, 151, 152 and 153, each controlled by a lever 155, 156, 157 and 158, respectively. Relief valve 160 is, in reality, contained within the valve bank 148, but is shown diagrammatically exteriorly thereof in the drawings for the purposes of clarity. This relief valve 160 is set at 1750–2000 p.s.i. and provided so that in the event the other portions of the system are closed fluid pumped by the pump 21 will be able to flow back to the tank 140. As a matter of fact, each of the sections 150, 151, 152 and 153 are provided with over-riding relief valves to prevent over-loads, each being set at 1500 p.s.i. The valve bank 148 is externally drained through line 149.

Fluid supply lines 50 and 51 lead from the valve bank section 150 to the drill motor 45. The drill motor 45 is preferably a vane type, 2000 p.s.i., reversible hydraulic motor that is externally drained into the supply tank 140 through the line 162.

Hydraulic fluid supply lines 165 and 166 lead from the valve bank section 151 to the tram motors 167 and 168, respectively. Tram motors 167 and 168 are preferably gear type, 2000 p.s.i., reversible hydraulic fluid motors, the tram motors being interconnected for synchronized operation by means of the lines 170, 171 and 172, and being externally drained through the lines 174, 175 and 176.

Hydraulic fluid supply lines 180 and 181 lead from the valve bank section 152 to the hydraulic lift cylinder 38. Each supply line 180 and 181 is provided with a flow regulator 185, each of which flow regulators is manually set for permitting flow of a predetermined supply of hydraulic fluid to and from the lift cylinder 38. A by-pass line 188 is "teed" into the supply line 180, intermediate the valve bank section 152 and the flow regulator 185, and a relief valve 190 provided in the line 188 for protecting the cylinder when the operating valve is in neutral. This relief valve is set at 1700 p.s.i., and the line 188 acts as an external drain, returning the fluid to the tank. The brake 106 and latch 110 are interconnected by hydraulic lines 108 and 120, respectively, to the valve bank section 153. These units may both be connected to the same valve bank section inasmuch as there will be no need for them to be operated simultaneously, i.e., when the latch is in operation the brake need not be used, and when the brake is in use there is no need for the latch. The line 108, leading to the brake 106, is provided with a flow regulator 195, which flow regulator is manually set for permitting the flow of a predetermined supply of hydraulic fluid to and from the brake 106.

Interconnected with supply line 145, intermediate the pump 21 and the valve bank 148, is a supply line 200 leading to a foot throttle 202. The foot throttle 202 comprises a normally open valve which will, upon depression of the lever 204, partially close, so that when no pressure is exerted upon the lever 204, all of the fluid being pumped by the pump 21 will be diverted from the supply line 145, through the foot throttle 202 and be returned to the tank 140, such as would occur when the motor 19 was in operation, but all of the various elements of the drill were idle.

Line 188, into which the lines 149 and 200 discharge, leads into a supercharging manifold 208. This supercharging manifold, and related structure, have been provided in order to facilitate the operation of the hydraulic pump 78 of the thrust head. As the pump 78 is of necessity located somewhat remotely from the tank 140, it was discovered that considerable cavitation would occur in the pump, i.e., that insufficient oil was being furnished to the pump, so that the pump became starved sufficiently to cause failure of the parts. The supercharging manifold 208 has thus been provided in order to supply a volume of low pressure fluid to the suction side of the pump to insure a supply of oil. A plurality of lines lead from the supercharging manifold 208 to the hydraulic pump 78, for the proper operation thereof. The line 210 leads from the supercharging manifold 208 to a flow regulator 212, which flow regulator is normally open, and which may be manually operated by the lever 213 to restrict the flow of fluid therethrough. A line 215 interconnects the inlet port of the flow regulator 212 with the supply line 217 leading to the pump 78. Also interconnected with the line 217, and leading into the supercharging manifold 208, are lines 220 and 221. Line 220 is provided with a check valve 223 and line 221 is provided with a relief valve 224, for purposes as will be subsequently described. Also interconnected between the supercharging manifold 208 and the hydraulic pump 78 are the lines 229 and 230, which lines lead into a common line 231 leading to the hydraulic pump 78. The line 229 is provided with a relief valve 235 preferably set at 500 p.s.i., and line 230 is provided with a check valve 237. The pump 78 is preferably a gear type, 2000 p.s.i., reversible hydraulic pump, and may be externally drained through the line 240 to the hydraulic fluid tank 140. A line 241 is provided leading from the supercharging manifold 208 to the tank 140, and a relief valve 242 is disposed in this line, which relief valve maintains a back pressure for retaining a sufficient amount of fluid in the manifold 208 to supply the pump 78. The relief valve 242 is preferably set at 40 p.s.i., so that back pressure will be maintained but the back pressure will not be sufficient to hamper the over-all operation of the system.

In the operation of the apparatus, the electric motor 19 is activated, rotating the shaft 144 and causing the pump 21 to operate, withdrawing hydraulic fluid from the tank 140, through the supply line 141, and discharging the hydraulic fluid, under pressure, through the line 145. At this time none of the various elements are in operation, and the foot throttle 202 will be open, so that all of the hydraulic fluid pumped through the line 145 will flow through the line 200, through the supercharging manifold 208, through the line 241, and thence into the tank.

The drill is now trammed forward into position adjacent the surface that is to be drilled by raising the lever 156 of the valve bank section 151 to feed hydraulic fluid through the line 165, and the foot throttle 202 is depressed slightly, causing restriction in the flow of fluid returning to the tank. The amount of depression of the foot throttle determines the fluid volume delivery into the valve bank 148, thereby regulating the fluid volume flowing through the valve bank section 151 for delivery to the tram motors 167 and 168. The greater the volume diverted to the tram motors, the greater the speed of these motors. When the tram motors are to be reversed, the lever 156 will be moved down, so that the hydraulic fluid is supplied to the tram motors through the supply line 166.

The track is then positioned by activating the cylinder 38. This is accomplished by moving the lever 157 into proper position for delivery of hydraulic fluid through either the supply line 180 or 181, depending on whether the hydraulic lift is to be raised or lowered, and the foot throttle 202 is depressed, to govern the supply of fluid to the hydraulic cylinder 38. The flow control regulators 185 have been previously set to a predetermined rate of flow of the hydraulic fluid to and from the cylinder 38. The relief valve 190 is provided in order to protect the cylinder when the operating valve is in neutral, so that excessive pressure will not be applied to the hydraulic lift cylinder. Such excessive pressure might be accidentally supplied by an external force acting on the track, such as would occur if the track hit the roof.

The drill motor 45 is then activated by moving lever 155 into position for feeding of the hydraulic fluid through the line 50, for clockwise drilling rotation of the auger, and the foot throttle 202 is depressed the desired amount for the desired speed of rotation of the auger. At this time, the rotary thrust tube 70, the shaft 77 of the pump 78, and the auger 55 will be rotating in a clockwise direction at the same rate of speed, with the flow regulator 212 fully opened and fluid circulating from the manifold 208, through check valve 237, through line 231, through the pump 78, through the line 217 and back to the tank 208 through the flow regulator 212.

The drill is now in condition for insertion into the working face, and at this time lever 158 will be actuated, retracting the latch 110, so that the carriage 47 carrying the drill motor 45 can be moved. The auger is now advanced by turning lever 213 of the flow regulator 212, thereby partially closing the flow control valve, so that the feed pump 78 is caused to work, exerting a back pressure on that pump which slows rotation of the pump which will, in turn, slow rotation of the shaft 141, causing a slowing down of the rotation of the rotary thrust tube 70, so that the rotary thrust tube 70, shaft 77 of the pump 78 and the auger 55 are no longer rotating at the same rate of speed. This slowed rotation of the shaft 77 is transmitted through the pump gear 76, to the drive gear 75, and thence to the rotary thrust tube 70, causing the rotary thrust tube 70 to rotate at the same rate of rotation as the pump, which is slower than the speed of rotation of the auger 55. This reduction in the speed of rotation of the rotary thrust tube 70 crowds the rollers 96 into abutment with the face of the scroll 57, and as the rollers are longitudinally fixed and cannot escape from between the helix of the flights 57, the rollers will follow the spirals of the rotating scroll 57 and will feed the auger 55 forward into the face.

The relief valve 224 is provided so that in the event the flow regulator 212 is closed to an excessive degree, the fluid in the line 217 will be released into the supercharging manifold through opening of the relief valve 224.

In the event that the auger penetrates to a drilling depth where the effort on the scroll to convey the cuttings from the hole is greater than that required to penetrate, causing the auger to feed in faster than the material can be conveyed and resulting in a choking action stalling the drill motor 45, the lever 158 of the valve bank section 153 may be operated to actuate the brake 106, so that the forward feeding of the auger will be slowed, allowing the scoll to rotate sufficiently to clear the hole of the cuttings as it advances.

As the auger is advanced the center guide G will float with advancement of the auger, along the shaft 132, providing support for the auger 55 and preventing "whipping" of the auger.

When it is now desired to withdraw the auger from the face, the lever 155 is moved into position for feeding of hydraulic fluid to the line 51, which reverses rotation of the drill motor 45, and thereby reverses rotation of the auger, which in turn reverses rotation of the rotary thrust tube 70. Reversal of the rotary thrust tube likewise reverses the drill feed pump 78, and fluid then flows to the pump 78 from the supercharging manifold through check valve 223, through the line 217 to the pump 78, thence through line 231, through the relief valve 235, and back to the supercharging manifold 208. Inasmuch as it is not necessary to vary the rate of withdrawal of the auger, but the same may remain constant, the relief valve 235, usually set at 500 p.s.i. will apply a constant back pressure in the line 231, exerting a constant working effort upon the pump 78, so that the rate of rotation of the pump is slowed down, thereby causing a slowing down in the rotation of the rotary thrust tube, causing the rollers 96 to abut the rear face of the scroll 57, and the auger 55 is withdrawn from the work by interaction of the rollers 96 and the scroll 57.

If, for any reason, the rate of withdrawal of the auger is discovered to be excessive at any given time, the brake 106 could be activated for slowing down the rate of withdrawal.

As the auger is withdrawn, and the carriage 47 retreats to its retracted position, the carriage 47 will operate, through the effect of shaft 132, to withdraw the center guide G into position for properly supporting the auger. The latch 110 automatically engages the carriage when it is fully retracted.

The process as above described is then repeated for as many drilling operations as may be required.

Various changes in the shape, size and arrangement of parts may be made to the form of the invention herein shown and described without departing from the spirit of the invention or the scope of the following claims.

We claim:

1. In a face drill for boring in a working face, the combination of a frame, said frame including a longitudinally extending track; an auger, said auger having a spiral scroll along the length thereof; a drill motor slidably mounted upon said track; means interconnecting said drill motor with said auger for rotatably supporting said auger in juxtaposition for rotation by said drill motor; and drill feeding means mounted upon said frame and operatively engaging said auger for advancing and retracting said auger with respect to said working face, said drill feeding means including a thrust housing having an auger receiving passageway therethrough, means for rotatably supporting said thrust housing upon said frame, adjacent one end of said track, said thrust housing normally rotating with and at the same speed as said auger, said auger extending longitudinally of said track from said drill motor, through the auger receiving passageway of said thrust housing and outwardly of the end of said track having said thrust housing mounted adjacent thereto, a plurality of cams mounted in a circumferentially spaced relationship upon said thrust housing and extending into the auger receiving passageway of said thrust housing, said cams being extendant into the auger receiving passageway of said thrust housing in juxtaposition for cooperative abutment with said scroll of said auger and providing means for the centering of said auger within the auger receiving passageway of said thrust housing and means for multiple engagement of said drill feeding means with said auger, and brake means interconnected with said thrust housing for retarding rotation thereof below the speed of rotation of said auger, the retarding of rotation of said thrust housing bringing said cams into cooperative abutment with said scroll of said auger, the abutment of said scroll with said cams advancing and retracting said auger into and out of the working face.

2. The combination as specified in claim 1 wherein each of said cams is longitudinally spaced from the other of said cams, axially of said auger.

3. The combination as specified in claim 1 wherein said scroll of said auger has a peripheral lip, and each of said cams has an auger contacting face, said auger contacting face of each of said cams being angularly disposed with respect to the scroll of said auger so that each of said cams abuts said scroll of said auger below the lip of said scroll.

4. The combination as specified in claim 1 wherein each of said cams has an auger contacting face and said auger has a shaft, the auger contacting face of each of said cams being angularly disposed with respect to said shaft of said auger, providing substantially point-to-point sliding, centering abutment with said shaft of said auger.

5. The combination as specified in claim 1 wherein said scroll of said auger has a peripheral lip and said auger has a shaft, each of said cams being roller cams having an auger contacting face, said cams having a rotating contact with the scroll of said auger, with the auger contacting face of said cams angularly disposed with respect to the scroll of said auger and abutting the scroll of said auger below the lip thereof, and the auger contacting face of said cams being angularly disposed with respect to the shaft of said auger, with said cams contacting the shaft of said auger in point-to-point sliding engagement.

6. In a face drill for boring in a working face, the combination of a frame, said frame including a longitudinally extending track; an auger, said auger having a spiral scroll along the length thereof; a drill motor slidably mounted upon said track; means interconnecting said drill motor with said auger for rotatably supporting said auger in juxtaposition for rotation by said drill motor; and drill feeding means mounted upon said frame and operatively engaging said auger for advancing and retracting said auger with respect to said working face, said drill feeding means including a thrust housing having a passageway therethrough, a rotary thrust insert mounted within the passageway of said rotary thrust housing and extending within the passageway of said thrust housing adjacent one end of said thrust housing, said rotary thrust insert having an auger receiving passageway therethrough, means for rotatably supporting said thrust housing upon said frame adjacent one end of said track, said thrust housing normally rotating with and at the same speed as said auger, said auger extending longitudinally of said track from said drill motor, through said thrust housing and outwardly of the end of said track having said thrust housing mounted adjacent thereto, a plurality of cams mounted in a circumferentially spaced relationship upon said thrust housing and extending into the passageway of said thrust housing in a spaced apart relationship with respect to said rotary thrust insert, said cams having a cam surface extendant into the passageway of said thrust housing in juxtaposition for cooperative abutment with said scroll of said auger and providing means for the centering of said auger within the passageway of said thrust housing and means for multiple engagement of said drill feeding means with said auger, said cams being removably mounted upon said rotary thrust housing and having mounting means for interconnection therewith of cam surfaces of different lengths, so that cams having cam surfaces of varying lengths may be removably mounted upon said rotary thrust housing for cooperative abutment with augers of a diameter interfitting within said rotary thrust insert, and brake means interconnected with said thrust housing for retarding rotation thereof below the speed of rotation of said auger, the retarding of rotation of said thrust housing bringing said cams into cooperative abutment with said scroll of said auger, the abutment of said scroll with said cams advancing and retracting said auger into and out of the working face.

References Cited in the file of this patent

UNITED STATES PATENTS

| | | |
|---|---|---|
| 539,491 | Snyder | May 21, 1895 |
| 2,206,184 | Graham et al. | July 2, 1940 |
| 2,644,669 | Curtis et al. | July 7, 1953 |
| 2,683,375 | Gerentes | July 13, 1954 |
| 2,792,689 | Phares | May 21, 1957 |
| 2,834,435 | Vanderbeck | May 13, 1958 |
| 2,887,299 | Hurd | May 19, 1959 |
| 2,958,514 | Lee | Nov. 1, 1960 |
| 2,964,296 | Cluff | Dec. 13, 1960 |
| 3,004,447 | Sand | Oct. 17, 1961 |
| 3,028,922 | Hudnall | Apr. 10, 1962 |

FOREIGN PATENTS

| | | |
|---|---|---|
| 883,881 | Germany | June 11, 1953 |
| 1,160,458 | France | Mar. 3, 1958 |